3,004,028
PREPARATION OF PHENOTHIAZINES
Morris A. Dolliver, Edison, Wilbur B. McDowell, Milltown, and John J. Pfeiffer, Jr., New Brunswick, N.J., assignors to Olin Mathieson Chemical Corporation, New York, N.Y., a corporation of Virginia
No Drawing. Filed May 16, 1957, Ser. No. 659,476
5 Claims. (Cl. 260—268)

This invention relates to, and has for its object the provision of, a new and improved process for the preparation of physiologically active phenothiazines and new intermediates utilizable in said process.

The therapeutically-active compounds preparable by the process of this invention include: (A) bases of the general formula

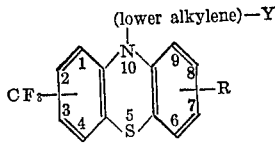

and (B) acid-addition salts thereof, wherein R is a member of the class consisting of hydrogen, lower alkyl, lower alkoxy, halo and trifluoromethyl, and Y is a basic nitrogen-containing radical of less than twelve carbon atoms. The terms "lower alkylene," "lower alkyl" and "lower alkoxy," as employed herein, include both straight and branched chain radicals of less than eight carbon atoms.

Among the suitable radicals represented by the symbol Y are: amino; (lower alkyl)amino; di(lower alkyl)amino; (hydroxy-lower alkyl)amino; di(hydroxy-lower alkyl)amino; and basic saturated monocyclic heterocyclic radicals of less than twelve carbon atoms, as exemplified by piperidyl [i.e., piperidino, 2-piperidyl, 3-piperidyl and 4-piperidyl]; (lower alkyl)piperidyl [e.g., 2, 3, or 4- (lower alkyl)piperidino or 2, 3, or 4-(N-lower alkyl) piperidyl]; di(lower alkyl)piperidyl [e.g., 2,4-, 2,6- or 3,5-di(lower alkyl)piperidino, or 2, 3, or 4-(N-lower alkyl-2,3, or 4-lower)piperidyl]; (lower alkoxy)piperdidyl; pyrrolidyl; (lower alkyl)pyrrolidyl; di(lower alkyl) pyrrolidyl; (lower alkoxy)pyrrolidyl; piperazyl; (lower alkyl)piperazino [e.g., N⁴-methylpiperazino]; (hydroxy lower alkyl)piperazino [e.g., N⁴-hydroxyethylpiperazino]; di(lower alkyl)piperazino; (lower alkoxy)piperazino; (lower carbalkoxy)piperazino; (hydroxyalkoxyalkyl) piperazino [e.g., N⁴-hydroxyethoxyethylpiperazino); acyloxyalkylpiperazino [eg., N⁴-acetoxyethylpiperazino]; and other basic saturated monocyclic heterocyclic radicals of less than twelve carbons.

Preferably the lower alkylene group has a two or three carbon chain between the nitrogen in the positions 10 and Y; R is hydrogen; the trifluoromethyl group is in the 2-position; and Y is a di(lower alkyl)amino or a piperazino group.

The salts (B) include the mono and di-acid-addition salts, particularly non-toxic pharmacologically acceptable acid-addition salts. Acids useful in preparing the addition salts comprise inter alia: organic acids, such as oxalic, tartaric, citric, succinic, acetic, theophylline, 8-chlorotheophylline, fumaric, lactic and maleic; and inorganic acids, such as nitric, sulfuric, phosphoric, boric and (especially) hydrohalic—for example, hydrobromic and hydrochloric.

These compounds are prepared by the process of this invention which may be represented schematically by the following formulae:

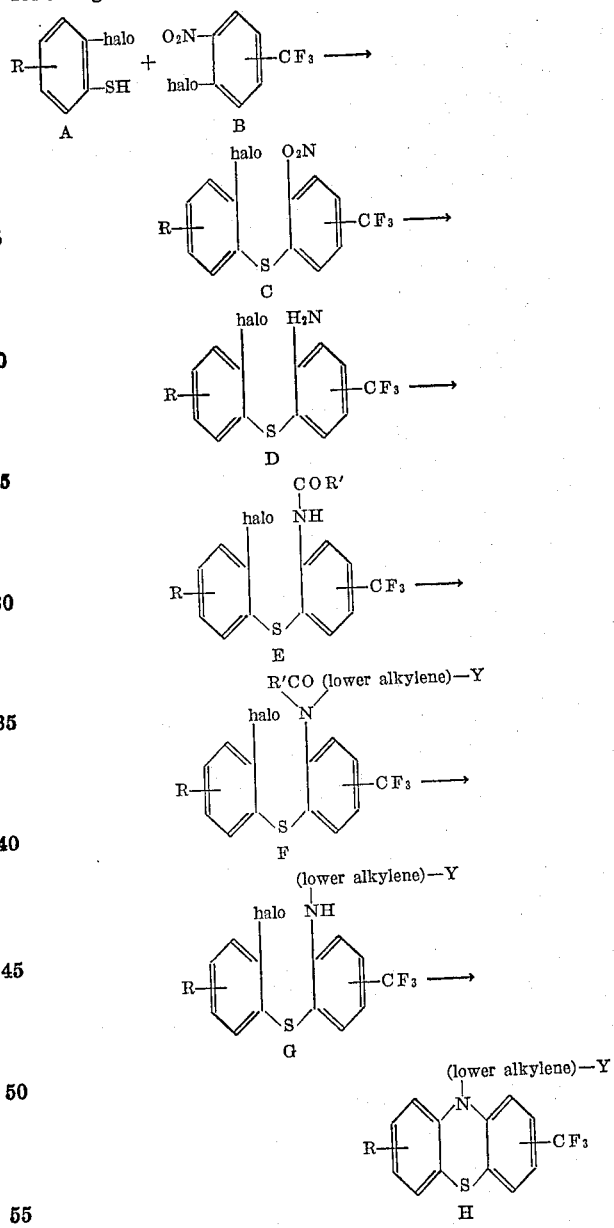

In the process of this invention, a 2-halothiophenol (Compound A) such as 2-bromothiophenol, 2-bromo-X-(lower alkyl)-thiophenol (e.g., 2-bromo-4-methylthiophenol and 2-bromo-6-ethylthiophenol), 2-bromo-X-(lower alkoxy)-thiophenol (e.g., 2-bromo-3-methoxythiophenol and 2-bromo-5-ethoxythiophenol), 2-bromo-X-halo-thiophenol (e.g., 2-bromo-3-chlorothiophenol and 2-bromo-5-chlorothiophenol) and 2-bromo-X-trifluoromethylthiophenol (e.g., 2-bromo-3-trifluoromethylthiophenol and 2-bromo-5-trifluoromethylthiophenol) is condensed with a trifluoromethyl-1-halo-2-nitrobenzene (Compound B), such as 4-chloro-3-nitrobenzotrifluoride, 3-chloro-4-nitrobenzotrifluoride and 2-chloro-3-nitrobenzotrifluoride. The condensation is conducted in the presence of a base, such as an alkali metal hydroxide (e.g., potassium hydroxide), preferably in an organic solvent such as ethanol. In order to increase the rate of reaction, the condensation is preferably conducted at an elevated temperature, such as the reflux temperature of the organic solvent. The reaction results in the preparation of a 2-nitro-X-trifluoromethyl-2'-halo-X'-R-diphenylsulfide (Compound C), wherein the position of the trifluoromethyl radical and the R radical corresponds to the relative position of these groups in the initial reactants. Thus, for example, by condensing 2-bromothiophenol with 4-chloro-3-nitrobenzotrifluoride, 2-nitro-4-trifluoromethyl-2'-bromo-diphenyl sulfide is obtained.

The nitro group on the resulting compound is then reduced as by hydrogenation in the presence of a hydrogenation catalyst. Suitable hydrogenation catalysts include the noble metals and, preferably, palladium. The reaction results in the production of a 2-amino-X-trifluoromethyl - 2' - halo - X' - R - diphenylsulfide (Compound D), wherein the positions of the trifluoromethyl and R groups are the same as those of the reactant.

Compounds D are then acylated by treatment with the acyl halide or acid anhydride or, as in the case of formic acid, the acid itself, the acid being of the formula R'COOH, wherein R' is hydrogen or a hydrocarbon radical of less than ten carbon atoms, as exemplified by the acyl chloride or acid anhydride of lower alkanoic acids (e.g., acetic acid), monocyclic aryl carboxylic acids (e.g., benzoic acid), monocyclic aralkanoic acids (e.g., phenacetic acid), lower cycloalkane carboxylic acids, lower alkenoic acids and lower cycloalkene carboxylic acids, thereby yielding a 2-acylamido-X-trifluoromethyl-2'-halo-X'-R-diphenylsulfide (Compound E), wherein the 2-acyl radical is that of the acylating agent and the position of the trifluoromethyl and R groups correspond to those of the reactant Compound D.

Compound E is then condensed with an aminoalkyl halide of the formula Y-(lower alkylene)-X, wherein Y is as above defined and X is halo (preferably chloro), the condensation preferably being conducted in the presence of a basic agent, such as an alkali metal, an alkali metal amide, or an alkali metal hydride. The condensation is optimally conducted in an organic solvent at an elevated temperature and yields a 2-[Y1(lower alkylene)-R'COamido] - X - trifluoromethyl-2'-halo-X'-R-diphenylsulfide (Compound F), wherein the Y-(lower alkylene) radical correponds to that of the aminoalkyl halide reactant, R'CO corresponds to the acyl radical of the diphenylsulfide reactant and the position of the trifluoromethyl and R groups correspond to those of the reactant Compound E.

Compound F is then hydrolyzed, as by treatment with a dilute acid (e.g., hydrochloric acid) to remove the acyl radical, R'CO, thereby yielding a 2-[Y-(lower alkylene)-amino]-X-trifluoromethyl-2'-halo - X' - R - diphenylsulfide (Compound G).

Compound G is then cyclized by treatment with a base such as an alkali metal carbonate (e.g., K₂CO₃) and copper metal at the reflux temperature of a relatively high boiling organic solvent such as dimethylformamide to yield the final product, Compound H, an X-trifluoromethyl-X'-R-10-Y-(lower alkylene)-phenothiazine.

In each of the above steps, wherein a compound containing a basic nitrogen atom is involved as a reactant, an acid-addition salt, such as the hydrochloride, may be employed instead of the free base. These acid-addition salts can be prepared by interacting the free base with an acid in the usual manner as by treatment with the desired acid in an organic solvent for the base and recovering the precipitated acid-addition salt. In the conversion of Compound D to Compound E, however, either the free base or the acid-addition salt of the acylating agent should be used.

The following examples are illustrative, but by no means limitative, of the invention:

EXAMPLE 1

*2-nitro-4-trifluoromethyl-2'-bromo-diphenylsulfide*

Nitrogen is bubbled through a solution of 11.26 gm. of 85% potassium hydroxide in 112.6 ml. of 95% ethanol at room temperature for 15 minutes. The nitrogen atmosphere is maintained throughout the reaction period. Thirty-eight gm. (0.20 mole) of o-bromothiophenol is added to the KOH solution. This solution is warmed to 50° C. and a solution of 49.5 gm. (0.225 mole) of 4-chloro-3-nitro-benzotrifluoride in 160 ml. of 95% ethanol is added during 1 hour at 50° C. The mixture is heated under reflux for 1 hour, cooled to 20° C. and treated with 200 ml. of water. The mixture is stirred for 30 minutes and the product removed by filtration. The yellow crystalline product is dried at 50° C. Yield: about 61.8 gm. (82% of theory); M.P. about 77–80° C.

EXAMPLE 2

*2-amino-4-trifluoromethyl-2'-bromo-diphenylsulfide*

14.7 gm. (0.0389 mole) of 2-nitro-4-trifluoromethyl-2'-bromo-diphenylsulfide is dissolved in 90 ml. of ethyl acetate and added to 2.94 gm. of 10% Pd on charcoal. This mixture is agitated under 50 p.s.i.g. of hydrogen. A hydrogen uptake of 110% of theory is observed in an hour, accompanied by an increase in temperature from 25° C. to 33° C. The catalyst is removed by filtration and the solvent stripped in vacuo. The residue (about 13.7 gm.) is recrystallized from 27.4 ml. of hexane. Yield: about 10.7 gm. (79.3%); M.P. about 74–76° C.

EXAMPLE 3

*2-formamido-4-trifluoromethyl-2'-bromo-diphenylsulfide*

2-amino-4-trifluoromethyl - 2' - bromo - diphenylsulfide (9.17 gm., 0.0264 mole) is slurried with 110 ml. of 90% formic acid at 90–100° C. for two hours. The warm mixture is diluted with 30 ml. of water and cooled at 25° C. The product is removed by filtration and washed with 110 ml. of water. Yield: about 9.5 gm. (96%); M.P. about 111–113° C.

EXAMPLE 4

*2-(dimethylaminopropylformamido)-4-trifluoromethyl-2'-bromo-diphenylsulfide hydrochloride*

Sodamide (0.542 gm., 0.0139 mole) is slurried with 16 ml. of diglyme (diethylene glycol dimethyl ether) in an atmosphere of nitrogen. A solution of 3.76 gm. (0.01 mole) of 2-formamido-4-trifluoromethyl-2'-bromo-diphenylsulfide in 34 ml. of diglyme is added to the sodamide slurry during 1 hour. The mixture is heated to 110° C. and 14.1 ml. of a 0.85 M diglyme solution of N,N-dimethylaminopropyl chloride (0.012 mole) is added during 1.5 hours. The mixture is stirred at 110° C. for an additional 2 hours. The mixture is cooled to room temperature and filtered. The solvent is stripped from this filtrate leaving 5.25 gm. of oil. This oil is dissolved in 150 ml. of acetone and treated with anhydrous HCl. The acetone is stripped and the solid residue is slurried with ethyl acetate, filtered and dried. Yield: about 1.9 gm. (38%); M.P. about 194–200° C.

EXAMPLE 5

*2-(dimethylaminopropylamino)-4-trifluoromethyl-2'-bromo-diphenylsulfide hydrochloride*

6.4 gm. (0.0128 mole) of 2-(dimethylaminopropylformamido)-4-trifluoromethyl-2'- bromo - diphenylsulfide hydrochloride is slurried in 100 ml. of 10% hydrochloric acid. This mixture is heated under reflux for 4 hours, cooled and stored at 5° C. overnight. The white crystalline product is removed by filtration and washed with cold water. Yield: about 4.98 gm. (89%); M.P. about 80–82° C.

EXAMPLE 6

10-(3-dimethylaminopropyl)-2-trifluoromethyl-phenothiazine hydrochloride 2-(dimethylaminopropylamino)-4 - trifluoromethyl - 2'-bromodiphenylsulfide hydrochloride (4.33 gm., 0.01 mole) is dissolved in 40 ml. of dimethylformamide. Potassium carbonate (3.4 gm.) and copper powder (0.16 gm.) are added and the mixture stirred under reflux for forty-eight hours. The cooled mixture is filtered and the residue is washed with 10 ml. of dimethylformamide. The combined filtrate and wash is mixed with 80 ml. of water. The oil which results is extracted into ether. The ether extract is dried, the solvent stripped and the residue dissolved in benzene. Hydrogen chloride is bubbled into this solution. The mixture is cooled for 16 hours, the crystalline product removed by filtration and dried. Yield: about 0.85 gm. (19.3%); M.P. about 197–200° C.

EXAMPLE 7

10-(3-dimethylaminopropyl)-4-trifluoromethyl-phenothiazine hydrochloride

By substituting 49.5 grams of 2-chloro-3-nitro-benzotrifluoride for the 4-chloro-3-nitro-benzotrifluoride in the procedure of Example 1 and following the procedures of Examples 2 through 6, there is obtained 10-(3-dimethylaminopropyl)-4-trifluoromethyl-phenothiazine hydrochloride.

EXAMPLE 8

10-(3-dimethylaminopropyl)-2-trifluoromethyl-8-methylphenothiazine hydrochloride By substituting 42 grams of p-methyl-o-bromothiophenol for the o-bromophenol in the procedure of Example 1 and following the procedures of Examples 2 through 6, there is obtained 10-(3-dimethylaminopropyl)-2-trifluoromethyl-8-methylphenothiazine hydrochloride.

EXAMPLE 9

10-(N-methylpiperazinopropyl)-2-trifluoromethyl-phenothiazine hydrochloride

By substituting 2.12 grams of N-methylpiperazinopropyl chloride for the N,N-dimethylaminopropyl chloride in the procedure of Example 4 and following the procedures of Examples 5 and 6, there is obtained 10-(N-methylpiperazinopropyl)-2-trifluoromethyl - phenothiazine hydrochloride.

Similarly, other aminoalkyl chlorides yield the corresponding 10-aminoalkylene derivatives. Thus, upon substitution of 3-diethylaminopropyl chloride, 2-dimethylaminoethyl chloride, 3-piperidinopropyl chloride or 3-(2'-pyrrolidyl)propyl chloride for the N,N-dimethylaminopropyl chloride in Example 4 and proceeding as described in Examples 5 and 6, 10-(3-diethylaminopropyl)-2-trifluoromethyl-phenothiazine hydrochloride, 10-(2-dimethylaminoethyl)-2-trifluoromethyl - phenothiazine hydrochloride, 10-(3-piperidinopropyl) - 2 - trifluoromethyl - phenothiazine hydrochloride and 10-[3-(2'-pyrrolidyl)propyl]-2-trifluoromethyl-phenothiazine hydrochloride are obtained, respectively.

The invention may be otherwise variously embodied within the scope of the appended claims.

What is claimed is:
1. A non-toxic acid-addition salt of 2-[di(lower alkyl)-amino - (lower alkyl)formamido] - 4 - trifluoromethyl-2'-bromo-diphenylsulfide.
2. 2 - (dimethylaminopropylformamido) - 4 - trifluoromethyl-2'-bromo-diphenylsulfide hydrochloride.
3. A process for preparing a compound selected from the group consisting of free bases of the general formula

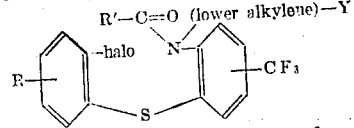

and non-toxic acid-addition salts thereof, wherein R is selected from the group consisting of hydrogen, lower alkyl, lower alkoxy, halo and trifluoromethyl, R' is selected from the group consisting of hydrogen and a hydrocarbon radical of less than ten carbon atoms free from acetylenic linkages, and Y is selected from the group consisting of di(lower alkyl)amino and a monocyclic saturated 5 to 6 membered basic heterocyclic nitrogen-containing radical of less than twelve carbon atoms, selected from the group consisting of piperidyl, (lower alkyl) piperidyl, di(lower alkyl)piperidyl, (lower alkoxy)piperidyl, pyrrolidyl, (lower alkyl)pyrrolidyl, di(lower alkyl) pyrrolidyl, (lower alkoxy)pyrrolidyl, piperazyl, (lower alkyl)piperazino, (hydroxy lower alkyl)piperazino, di-(lower alkyl)piperazino, (lower alkoxy)piperazino, (lower carbalkoxy)piperazino, (hydroxy alkoxyalkyl)piperazino and acyloxyalkyl-piperazino, which comprises reacting at about 100° C. a compound of the general formula

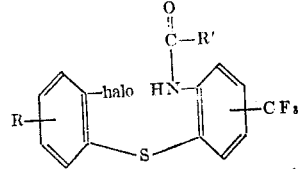

wherein R and R' are as above-defined with a compound of the general formula Y-(lower alkyl)halide, wherein Y is as above-defined in the presence of a basic catalyst.
4. A compound selected from the group consisting of 2-[di(lower alkyl)amino-(lower alkyl)formamido]-4-trifluoromethyl-2'-bromo-diphenylsulfide and non-toxic acid addition salts thereof.
5. 2-[piperazinyl-(lower alkyl)-4-formamido]-4-trifluoromethyl-2'-bromo-diphenylsulfide.

References Cited in the file of this patent
UNITED STATES PATENTS 2,769,002 Buisson et al. ———————— Oct. 30, 1956
2,837,518 Jacob et al. —————————— June 3, 1958

OTHER REFERENCES

Massie: Chem. Reviews, vol. 54 (1954), pages 798–833 (page 830 relied upon).

UNITED STATES PATENT OFFICE
CERTIFICATION OF CORRECTION

Patent No. 3,004,028 October 10, 1961

Morris A. Dolliver et al.

It is hereby certified that error appears in the above numbered patent requiring correction and that the said Letters Patent should read as corrected below.

Column 1, line 42, for "4-lower)" read -- 4-lower alkyl) --; column 6, line 36, for "100° C." read -- 110° C. --;

Signed and sealed this 24th day of April 1962.

(SEAL)
Attest:

ESTON G. JOHNSON
Attesting Officer

DAVID L. LADD
Commissioner of Patents